United States Patent

[11] 3,608,595

[72] Inventor John W. Oehrli, deceased
late of Pacific Palisades, Calif. by Lillian M. Oehrli, executrix
[21] Appl. No. 743,822
[22] Filed July 10, 1968
[45] Patented Sept. 28, 1971

[54] SAW CHAIN
20 Claims, 10 Drawing Figs.
[52] U.S. Cl........................................ 143/135, 143/32
[51] Int. Cl........................................ B27b 33/14
[50] Field of Search........................... 143/135, 32

[56] References Cited
UNITED STATES PATENTS
2,652,076 9/1953 Bye .............................. 143/135 (-7)
3,189,064 6/1965 Fredrickson ................. 143/135 (-7)
2,832,380 4/1958 Crowe........................... 143/137
FOREIGN PATENTS
1,332,584 6/1963 France .......................... 143/135

Primary Examiner—Donald R. Schran
Attorney—Forrest J. Lilly

ABSTRACT: A scratcher-type saw chain having scratcher and raker cutters, some with positive back rake cutter chisel edge angles which tend toward undue penetration into the kerf, and which uses, to counteract this tendency, negative to zero back rake angles on certain leading side cutter edges.

PATENTED SEP 28 1971 3,608,595

JOHN W. OEHRLI
INVENTOR.

BY
ATTORNEY

SAW CHAIN

FIELD OF THE INVENTION

This invention relates generally to saw chain, and is directed primarily to a saw chain which dispenses with depth gauges and which has a cutter on each pair of side links. The chain is broadly of the so-called scratcher type, having both side cutters and rakers. The chain of the invention is also of two types, one for right-angle crosscutting, and a second for ripping, or crosscutting at an angle to the grain, under conditions characteristic of both crosscutting and ripping.

BACKGROUND OF THE INVENTION

Saw chain is of two general classes, scratcher chain, and chipper or chisel chain. To limit the depth of penetration of the chipper or chisel tooth cutter, modern chain of this class utilizes a so-called depth gauge preceding the cutter, the depth gauge comprising a lug, of lesser height than the cutter tooth, engaging the bottom of the kerf, and so fixing the depth of the cut. Unfortunately, the height of such depth gauges is not readily adjustable as the chain is used in the field with different sizes and hardnesses of wood, irrespective of available speed and power. A compromise is generally used, resulting, for many field conditions, in loss of cutting speed, safety, smooth cutting, etc.

Depth gauges have also been used limitedly on so-called scratcher chain, accompanied by somewhat similar problems. Scratcher chain without depth gauges has been widely used in the past, but has never attained its full potential owing to certain inbuilt limitations which have never, to my knowledge, been corrected. Such limitations have included too close a spacing of successive teeth, resulting in literal production of saw dust or slivers, rather than clean cutting and slicing out of chips or pieces of wood.

The invention is also addressed to the problem of ripping, and to crosscutting but at an angle to the grain, where the characteristics and problems of ripping enter to a degree. For these applications, it is particularly desirable to use pointed cutter teeth, as is well known to those skilled in the art. Such teeth, however, have an undue tendency to penetrate too deeply into the wood, and hence, it has been common practice to use depth gauges therewith.

SUMMARY OF THE INVENTION

The cutters of the invention are of the scratcher class. The first concept of the invention is to eliminate depth gauges as such, and to secure stability and control by use on the front cutting edges of certain of the links, of angles which tend to restrain penetration into the wood. For pure crosscutting, I use side cutters and rakers, the side cutters, as well as certain cutting edges on the shanks of the rakers' having their cutting edges formed with a zero or preferably negative back rake in order to restrain undue penetration into the wood. These angled cutter edges, it will be understood, have a natural tendency to restrain or counteract any tendency to penetrate too deeply into the wood. The preferred rakers, on the other hand, have a beveled laterally extending chisel edge which does tend toward penetration into the wood. Accordingly, the angled cutting edges set to restrain penetration counteract a part of the tendency for the chisel edges of the rakers to penetrate, and controlled penetration, with exceptionally fast cutting together with improved stability, is thus accomplished.

For ripping, or angle cutting, I use somewhat pointed or hooked side cutters, but to avoid depth gauges, and achieve fast cutting, and the other advantages mentioned hereinabove, I use cutters, both immediately before and immediately aft of these pointed cutters, which have front cutting edges with zero or preferably negative back rake, so as to resist the tendency of the pointed cutters to penetrate into the wood. Some of these latter cutters are preferably rakers of the type mentioned in the preceding paragraph, with angled chisel edges having a penetrating tendency, which is also controlled by my combination of cutters using certain front cutting edges at zero or preferably negative back rake.

DESCRIPTION OF THE DRAWINGS

Reference is now directed to the drawing showing certain illustrative embodiments of the invention, and wherein.

DESCRIPTION OF A PREFERRED EMBODIMENT

Figure 1:
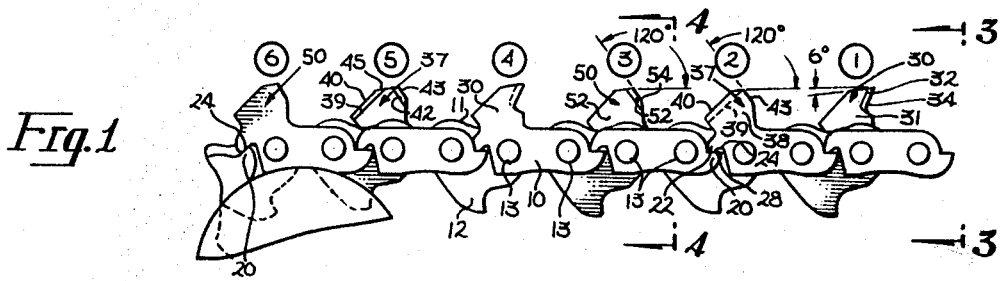
FIG. 1 is a side elevation of a portion of a saw chain showing a sequence of six cutters in accordance with the invention.
Figure 2:
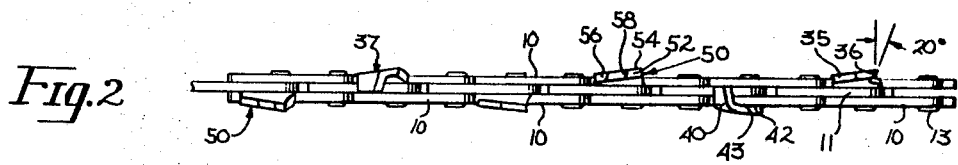
FIG. 2 is a top plan view of the saw chain of FIG. 1.

Referring now to the drawings, and particularly to FIGS. 1 and 2, I show a presently preferred form of saw chain disclosed and claimed in my copending U.S. application entitled "SAW CHAIN," Ser. No. 743,843, filed July 10, 1968 and now U. S. Pat. No. 3,542,096. This particular chain has the unique characteristic that it is provided with means by which its links are constrained to pure rectilinear travel while riding on the longitudinal edges of the saw bar, without tendency for the cutters to tilt outwardly on their rearward pivots, and this characteristic is uniquely important and advantageous when used without depth gauges, and has a special function in connection with the particular cutters of the present invention. This chain has the further unique characteristic that its cutter-carrying links are constrained against tilting outward about their rearward pivots while going around the usual sprocket or other guide at the rearward end of the saw bar, which characteristic permits accurate sharpening of the cutters by certain sharpening techniques. It is to be further understood, however, that in broadest aspects, the provisions affording these characteristics may be omitted.

With the foregoing in mind, the present chain has pairs of side links 10, alternating with center drive links 11, the latter being formed with lugs or roots 12 adapted to ride in the groove of a conventional saw bar, and to be sprocket-driven in a well-known fashion. The links 10 and 11 are connected to one another by pivots 13, in the usual manner. The side links 10 have cutters, as illustrated, and as will be more particularly described hereinafter.

The front end of each side link has a generally longitudinal front projection or toe 20, and the rear end of each side link has a generally longitudinal rear projection or toe 22, the latter overlying the former. The upper edge or flank of the toe 20 lies substantially in a longitudinal plane through the pivot axes of the chain. The projection 20 is adapted to be received into a notch 24 on the underside of the projection 22, and the latter is adapted to enter into a notch 28 formed at the base of the projection or toe 20. The toe 22 extends angularly down so that its tip engages the toe 20 at the base of its upper flank when the links are rectilinearly aligned; and when the links are angularly disposed relative to one another, as in going around a sprocket, the tip of the toe 22 moves outwardly along the upper flank of the toe 20, so that in the latter position, the toe 22 holds down the following link 10 by engagement of its tip with the outer end portion of the flank of toe 20, whereby the links are held against outward tilting while going about the sprocket. In the rectilinearly aligned position, as when traversing the saw bar, the tip of the toe 22 on the trailing end portion of a given link 10 holds down the forward end portion of the following link 10 by engaging the flank of the toe 20 near the base of the latter, all as discussed in my aforementioned copending application Ser. No. 743,843. This, of course, is the desired performance of the chain on the straight edges of the saw bar, and contributes a beneficial environment for the present invention.

When the saw chain goes around a drive sprocket, illustratively a conventional rim sprocket, such as 5, the successive side links and the intervening center links tilt to angles relative to one another wherein the projection 20 on a given following side link enters into the notch 24 of the immediately preceding side link, and engages a side surface of said notch as a stop. The following link is thus restrained against outward pivoting on its rearward pivot, and the links thus go around the sprocket in a true arc, facilitating sharpening procedures. This feature of the illustrated chain is not pertinent to the present invention and, accordingly, will not be further discussed. Reference may be had for further details to my copending application entitled "SAW CHAIN," Ser. No 743,843.

In FIGS. 1 and 2, a sequence of cutters 1, 2, 3, 4, 5, and 6 is shown, and it will be understood that the sequence then repeats itself after cutter No. 6, starting over with 1, 2, 3, etc. In the sequences illustrated in FIGS. 1 and 2, cutter No. 1 is a left-hand side cutter 30 (as viewed in the direction of travel of the chain) rising from a left-hand side link 10, over the rear pivot thereof, and embodies a shank 31 offset outwardly somewhat in a conventional manner, as shown in FIG. 2. The cutter has a front cutting face 32 formed at an acute angle, for example, at 70° to a horizontal longitudinal line, so as to provide a pointed or "hooked" form of cutter, with a positive back rake of 20° (FIG. 2). The front cutting edge or face 32 is bevelled at an angle of for example substantially 20° to a leading knife edge 34 at the outer plane of the cutter. This edge 34 thus has a large positive back rake. The top 35 of the cutter may have a normal clearance angle of, for example, 6°. Its side may also have a usual side clearance angle, as will be understood. The intersection of the knife edge 34 with the top 35 forms an angled transverse cutting edge 36, and the edges 34 and 36 act to cut a left-hand side groove in the kerf, and because of the point or hook at the apex of its cutting edge, formed at a large positive back rake angle, as aforesaid, it has a tendency to penetrate into the wood. Without some restraining means, such a cutter tends often to penetrate too deeply into the kerf, and accordingly, as mention hereinabove, it is common to use depth gauges therewith to control this tendency. The present invention uses, instead of depth gauges, certain cutter forms which not only cut but function to restrain and control this undue penetration tendency, as will be described more fully hereinafter. It is to be understood that the "hooked" or "pointed" positive back rake cutter No. 1 (as well as subsequently mentioned No. 4), is particularly useful and effective in ripping, or in crosscutting at an angle to the grain, since such a cutter is more effective in severing the fibers of the wood presented "end on" in the case of ripping or angle cutting.

In the cutter sequence shown for illustrative purposes in FIGS. 1 and 2, the No. 1 cutter 30 will be understood to be preceded by a No. 6 cutter, described later. The No. 2 cutter 37 immediately following the pointed No. 1 cutter 30 is a right-hand raker, which may be described as of a substantially L-shaped type. That is to say, it has a somewhat outwardly offset shank 38 rising from the side link over the rear pivot of the latter, and a toe or hood 40 bent over on a line 39 which is in the longitudinal plane of the chain and at an angle of approximately 45° to the longitudinal direction of the chain. The raker cutter 37 has a leading side cutter face or edge 42, formed preferably at 120° with the longitudinal line of the chain, as indicated, or in other words, with a negative back rake of 30°. The face or edge 42 is bevelled at substantially 20° to a leading knife edge 43 at the outer plane of the cutter. The top edge 44 of the cutter is formed with a top clearance angle of, for example, 6°, and this top edge 44 intersects the front edge 42 to form a transverse angled cutting edge 45. Top edge 44 extends rearwardly from cutting edge 45 and then turns laterally to form the top edge 44a of the toe or hood 40, at a slightly lowered elevation. The cutting edge 45 is preferably about 0.008 inches lower than the apex of the pointed side cutter No. 1. A knife or chisel edge 45a will be observed at the front of the edge portion 44a *of the toe or hood 40, and owing to the longitudinal angle of the toe 40, a raker cutter of positive back rake angle is afforded by this construction.*

The shank 38 of the raker cutter 37 is offset outwardly, so as to follow in the groove cut outboard of the side links by a preceding side cutter similar to cutter No. 1, but on the opposite side of the chain. The toe 40 extends laterally from its shank across the path of the center links. The top edge portion 44a of the raker, from the shank 38 to the end of the toe 40, will be seen to have a substantial lateral incline in the rearward direction of the chain. The shank 38 also preferably has a conventional side clearance.

The side cutter knife edge 43 is shown as having a negative back rake angle of 30°. The raker cutter thus has leading side cutter and top knife edges 43 and 45 respectively, which deepen the corresponding side groove in the kerf, followed by a slightly lower chisel edge 45a on the forward edge of its toe 40, which acts to slice out pieces of wood between the two side grooves being formed at opposite edges of the kerf.

Cutter No. 3, designated at 50, is another side cutter. It has a shank 51 rising from the left-hand side link 10 over the rear pivot 13 of said link, and this shank has the usual outward offset from its link 10, and has a front cutting surface or edge 52, bevelled at about 20°, for example, to a leading knife edge 54 at the outer plane of the shank. The face or edge 52, and the knife edge 54, are at, for example, 120° to the longitudinal direction line of the chain, or in other words, have a large negative back rake angle, in this case, of 30°. The shank may have a conventional side clearance angle, and the top edge 56 of the tooth a clearance angle of approximately 6°. The leading knife edge 54 and top edge 56 intersect to form a transverse angled cutting edge 58, whose height is less than that of the apex of cutter No. 1, e.g., by 0.008 inches, and may be of the same height as the cutting edge 45 at the apex of the raker cutters. Cutter No. 3 functions, as will be clear, to deepen the left-hand groove cut in the kerf.

Cutters No. 4, 5, and 6 are exactly like cutters Nos. 1, 2, and 3, respectively, excepting for being reversed right for left in each case.

It will be understood that left-hand cutters Nos. 1 and 3 cut and deepen a groove defining the left-hand margin of the kerf, while cutters Nos. 4 and 6 cut and deepen a groove defining the right margin of the kerf. The rackers, Nos. 2 and 5, first further deepen the edge grooves, and then slice or chisel out the wood therebetween, at a level just slightly above the depth of the edge grooves. The two tall cutters Nos. 1 and 4, of positive back rake, cut a relatively deep groove, both because of their height above the other cutters and also because of their large back rake angle. This penetration, however, is restrained and controlled by the negative back rake angles on the cutters immediately preceding and following the positive rake cutters 1 and 4. Thus, in the case of the positive rake cutter No. 4, the penetration urge is restrained by a counteracting penetration resistance caused by the negative rake angles of the leading cutting edges on cutters Nos. 3 and 5; and in the case of positive rake cutter NO. 1, the penetration urge is restrained by a counteracting penetration resistance caused by the negative rake angles on cutter No. 2, and a cutter like No. 6 of the sequence, but understood to be the last cutter of the preceding sequence, and therefore to immediately lead the illustrated cutter No. 1. The desired cutter sequence restrains the tendency of the cutters to cut too deeply, with the known problems arising therefrom, and stabilizes them to make smooth cuts of ample depth, with the cutters amply spaced to yield chips of good length, and all factors balanced to permit the attainment of new levels of cutting smoothness and speed for the power available.

Figure 1A:
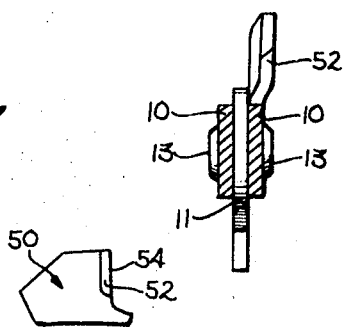
FIG. 1a is a fragmentary detail of a modified form of cutter which may be used in the invention.

It will be understood that the positive back rake angle of the cutters 1 and 4 and the negative back rake angles of the remaining cutters can most advantageously be balanced against one another to work best in any given type or hardness of wood, and that the illustrative chain of FIGS. 1–4 represents a favorable compromise. In some cases, the back rake angle of one or both of the two left-hand and two right-hand side cutters can be reduced to zero degrees, with retention of the restraint against overly deep penetration of the positive back rake cutters. This is true also of the side cutter portions of the rakers, as mentioned in the Summary of the Invention. Consider a given cutter, such as No. 3 in FIGS. 1-4, and assume that its back rake angle is reduced to zero degrees (see FIG. 1a). When the cutter, which is being pulled ahead by a force acting along the chain on a line through the pivots 13, engages the kerf, there is a moment of force acting about the rear pivot 13 tending to rock the link counterclockwise, and thus tending to oppose cutter penetration into the kerf. Such rocking movement is of course resisted by the engagement of the tail extension on the side links of the cutter against the front end extensions on the side links of the following cutter. The overall result is for the line of links as a whole to tend to stay down on the saw bar, as opposed to rising or lifting as may be the tendency of a positive back rake cutter such as 1 or 4. Accordingly, even with zero back rake on my cutters Nos. 2, 3, 5, and 6, the chain has an inherent bias toward staying down on the saw bar, and so resisting the penetration tendency of the positive back rake cutters Nos. 1 and 4 used particularly for their effectiveness is ripping or angle cutting. For given available power, the combined smoothness and cutting effectiveness of this chain are superior to those of any comparable saw chain of which I am aware.

Figure 5:
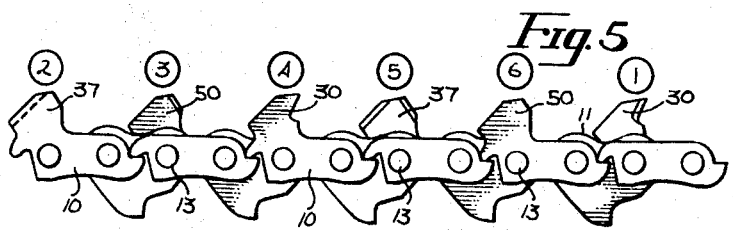
FIGS. 5–9 are side elevational views similar to FIG. 1 but showing modifications thereof within the scope of the invention.
Figure 6:
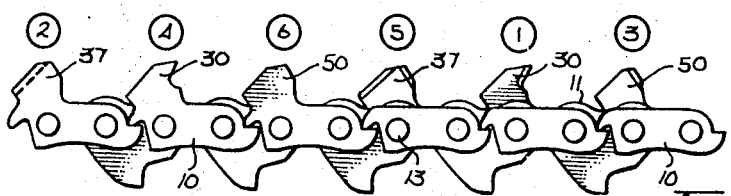
Figure 7:
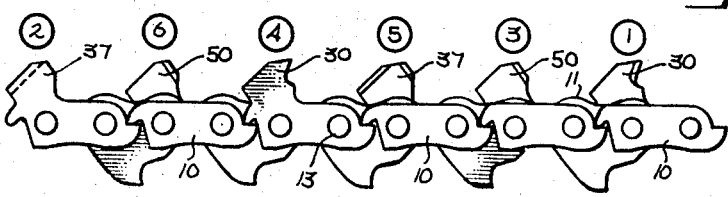

FIGS. 5 to 7 are similar to FIG. 1, but show optional alternative sequences of the cutters of FIG. 1. In FIG. 5, the sequence is 1, 6, 5, 4, 3, and 2; in FIG. 6, it is 3, 1, 5, 6, 4, 2; and in FIG. 7, it is 1, 3, 5, 4, 6, and 2. Those skilled in the art will appreciate without further description how the invention is carried out by these alternative sequences.

Figure 8:
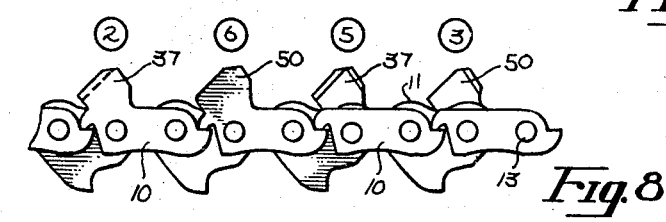

FIG. 8 shows a sequence appropriate for pure cross cutting, and consisting of 3, 5, 6, 2, the positive back rake cutters being omitted. It will be seen that this is the sequence of FIG. 1, but with cutters Nos. 1 and 4 omitted. In this case, the penetration tendency is solely from the chisel edges 45a of the rakers, Nos. 2 and 5, and this tendency is counteracted and controlled, and the chain stabilized, by the negative back rake angles of the leading side cutter edges 43 and 54 on cutters Nos. 2, 6, 5, and 3. The chain with this combination of cutters operates with a relatively high degree of smoothness, at a fast cutting rate, and produces chips of good thickness and length.

Figure 9:
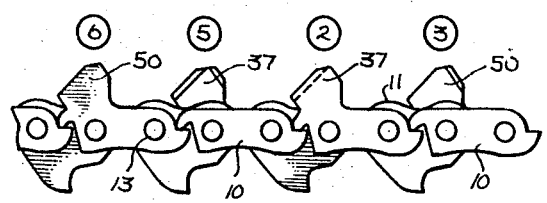
Figure 3:
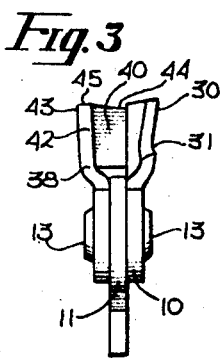
FIG. 3 is a transverse section taken on line 3—3 of FIG. 1.
Figure 4:
FIG. 4 is a transverse section taken on line 4—4 of FIG. 1.

An alternative to the chain of FIG. 8 is shown in FIG. 9, where the cutter sequence is 3, 2, 5, and 6. Those skilled in the art will understand that the discussion above applies also to the sequence of FIG. 9.

As with the six cutter sequences, the four cutter sequences can use negative back rake angles of different angles to advantage, and the rake can even be reduced in some cases to zero degrees, which is the lower limit of the invention. This reduction to or toward 0° has the further advantage of allowing longer periods for cutting before sharpening is needed.

It will be understood that the foregoing description and the drawings are merely illustrative of the invention in certain of its presently conceived physical forms, and that various changes in design, structure, and arrangement may be made without departing from the scope of the invention or of the appended claims.

I claim:

1. In a scratcher-type saw chain, the combination of:
pairs of side links connected by front and rear pivots to rear and front pivot points, respectively, of intervening center links,
cutters on said side links, said cutters including:
right and left-hand side cutters having leading cutter edges with back rake angles in a range from zero to negative,
right and left-hand raker cutters having leading cutter edges with back rake angles in a range from zero to negative, and
right and left-hand side cutters having leading cutter edges with positive back rake angles, each of said last-mentioned side cutters being both immediately preceded and immediately followed by a cutter having a back rake angle in a range from zero to negative.
2. The chain of claim 1, wherein the first-mentioned side cutters and the raker cutters have leading cutter edges of negative back rake angle.
3. The chain of claim 1, wherein at least the first-mentioned side cutters have leading cutter edges of negative back rake angle.
4. The chain of claim 1, wherein at least the raker cutters have leading cutter edges of negative back rake angle.
5. In a scratcher-type saw chain, the combination of:
pairs of side links connected by front and rear pivots to rear and front pivot points, respectively, of intervening center links,
cutters on said side links,
said cutters including:
right and left-hand side cutters having leading cutter edges with back rake angles in a range from zero to negative,
right and left-hand raker cutters having outwardly offset shanks formed with leading cutter edges with back rake angles in a range from zero to negative, and having toe portions projecting laterally from said shanks across said center links and provided with chisel edges, and
right and left-hand side cutters having leading cutter edges with positive back rake angles, each of said last-mentioned side cutters being both immediately preceded and immediately followed by a cutter having a back rake angle in a range from zero to negative.
6. The chain of claim 5, wherein the first-mentioned side cutters and the raker cutters have leading cutter edges of negative back rake angle.
7. The chain of claim 5, wherein at least the first-mentioned side cutters have leading cutter edges of negative back rake angle.
8. The chain of claim 5, wherein at least the raker cutters have leading cutter edges of negative back rake angle.
9. The subject matter of claim 6, wherein said cutters are distributed, in sequence: left-hand side cutter of positive back rake, right-hand raker cutter, left-hand side cutter of negative back rake, right-hand side cutter of positive back rake, left-hand raker cutter, and right-hand side cutter of negative rake.
10. The subject matter of claim 6, wherein said cutters are distributed, in sequence: left-hand side cutter of positive back rake, right-hand side cutter of negative back rake, left-hand raker, right-hand side cutter of positive back rake, left-hand side cutter of negative back rake, and right-hand raker.
11. The subject matter of claim 6, wherein said cutters are distributed, in sequence: left-hand side cutter of negative back rake, left-hand side cutter of positive back rake, left-hand raker, right-hand side cutter of negative back rake, right-hand side cutter of positive back rake, and right-hand raker.
12. The subject matter of claim 6, wherein said cutters are distributed, in sequence: left-hand side cutter of positive back rake, left-hand side cutter of negative back rake, left-hand raker, right-hand side cutter or positive back rake, right-hand side cutter of negative back rake, right-hand raker.
13. A scratcher-type saw chain without elevators comprising, the combination of:
pairs of side links connected by front and rear pivots to rear and front pivot points, respectively, of intervening center links,
cutters on said side links, said cutters including:
right and left-hand side cutters having leading cutter edges with back rake angles in a range from zero to negative, and
right and left-hand raker cutters having outwardly offset shanks formed with leading side cutter edges with back rake angles in a range from zero to negative, and having toe portions projecting laterally from said shanks across said center links and provided with chisel edge cutters of positive rake angle,
said cutter edges having rake angles balanced relative to one another to comprise the sole means for limiting and determining cutter penetration.
14. The chain of claim 13, wherein said cutters have leading side cutter edges of negative back rake angles.
15. A saw chain having pairs of side links connected by front and rear pivots to rear and front pivot points, respectively, of intervening center links, cutters on side links having cutter edges over the rear pivots thereof, some of said cutters having negative to zero rake, and some of said cutters having positive rake, with the latter cutters interspersed with the former, the cutters of positive rake including raker cutters having sharpened side cutter shanks with toe portions projecting laterally from the shanks across the center links and provided with chisel edges having positive back rake angles, the other cutters aforementioned being side cutters, said cutter edges having rake angles balanced relative to one another to comprise the sole means for limiting and determining cutter penetration.

16. A saw chain having pairs of side links connected by front and rear pivots to rear and front pivot points, respectively of intervening center links, cutters on side links having cutter edges over the rear pivots thereof, some of said cutters having negative rake, and some of said cutters having positive rake, with the latter cutters interspersed with the former, the cutters of positive rake including raker cutters having sharpened side cutter shanks with toe portions projecting laterally from the shanks across the center links and provided with chisel edges having positive back rake angles, the other cutters aforementioned being side cutters, said cutter edges having rake angles balanced relative to one another to comprise the sole means for limiting and determining cutter penetration, and the side cutters including cutters of positive rake on some of the side links above the rear pivots thereof, said last mentioned side cutters rising slightly above the height of the raker cutters.

17. The subject matter of claim 15, wherein the side cutters are of negative rake.

18. The subject matter of claim 16, including side cutters of negative rake.

19. The subject matter of claim 5, and including also portions on the trailing ends of the cutter carrying links which bear on leading end portions of the next following cutter-carrying link when the links are in a straight line, so as to prevent the leading ends of the cutter-carrying links from tilting upwards about the rear pivots thereof.

20. The subject matter of claim 15, and including also portions on the trailing ends of the cutter-carrying links which bear on leading end portions of the next following cutter-carrying link when the links are in a straight line, so as to prevent the leading ends of the cutter-carrying links from tilting upwards about the rear pivots thereof.